Nov. 27, 1951     L. F. WOUTERS     2,576,661
PULSE SHAPING CIRCUIT
Filed Sept. 28, 1950
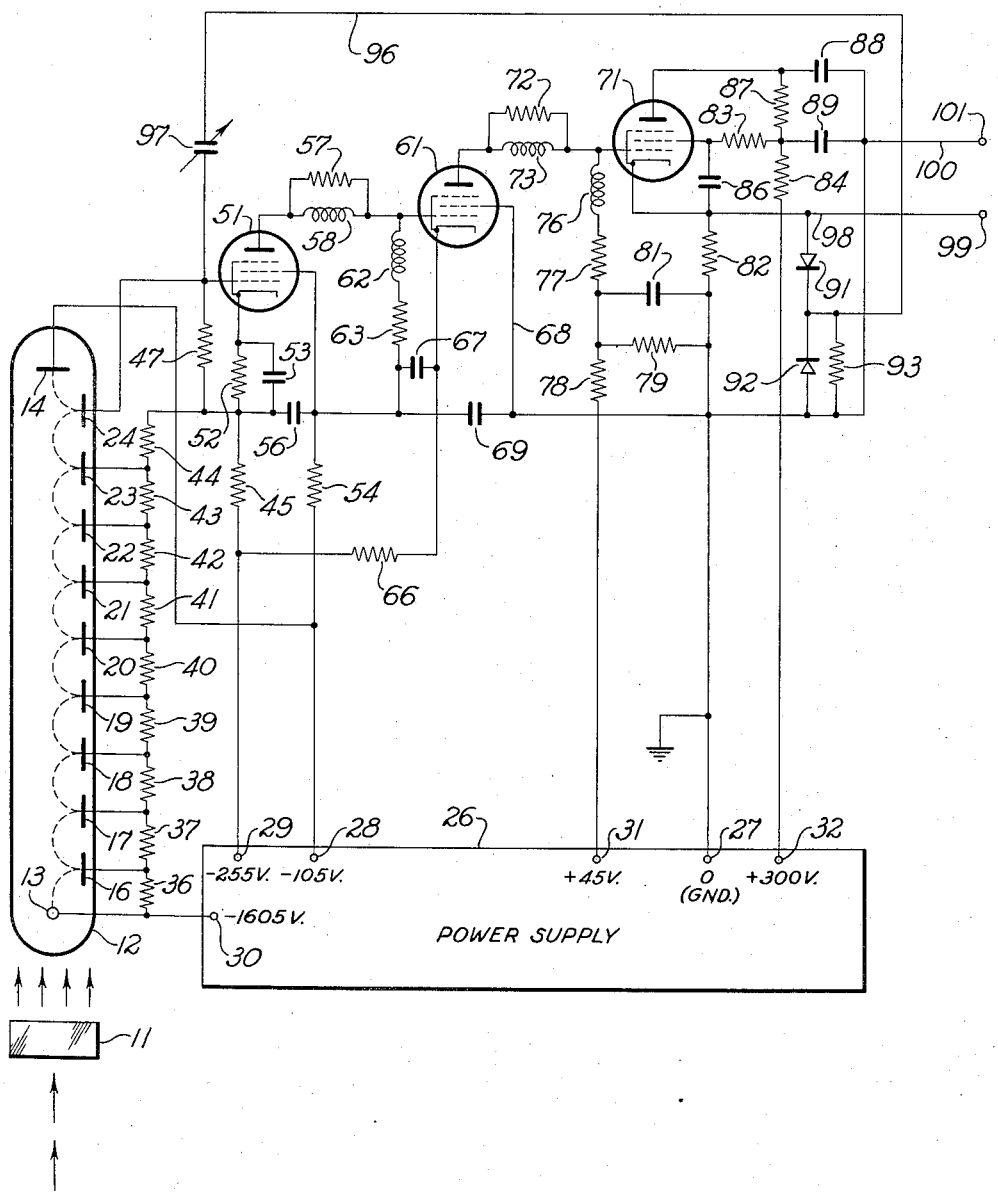
INVENTOR.
LOUIS F. WOUTERS
BY
ATTORNEY.

Patented Nov. 27, 1951

2,576,661

UNITED STATES PATENT OFFICE 2,576,661

PULSE SHAPING CIRCUIT

Louis F. Wouters, Oakland, Calif., assignor to the United States of America as represented by the United States Atomic Energy Commission Application September 28, 1950, Serial No. 187,331

5 Claims. (Cl. 250—207)

This invention relates to a pulse shaping circuit and more particularly to a pulse shaping circuit for a photomultiplier tube circuit.

Scintillation counter have become very useful in the detection and counting of radiation; however, it has been found that present circuits are inadequate to properly handle pulses of light given off by the fluorescing crystals of material utilized. For proper counting it is desired that the light pulse from the scintillation crystal be detected and translated into a uniform square pulse of voltage. The detection may be readily accomplished by commercially available photomultiplier tubes, but the interelectrode capacitances of the tube and of the following circuit cause the decay time of the pulse to trail considerably because of the time required to discharge such capacitance.

To accomplish the aforementioned desirable features a two stage linear amplifier circuit is connected to a multielectrode photomultiplier tube. The output of the amplifier is connected to a discriminator tube having cathode follower characteristics. Further, a portion of voltage of the cathode follower is positively fed back to the amplifier input through a capacitor which forms a differentiator with the grid resistor of the amplifier input stage to return the circuit to its normal condition.

It is therefore an object of the invention to provide a new and improved pulse shaping circuit.

A further object of the invention is to provide a pulse shaping circuit for use with a photomultiplier tube.

Another object of the present invention is to provide a photomultiplier tube circuit wherein a positive feedback circuit is utilized to discharge interelectrode and distributed capacitance.

A still further object of the invention is to provide a pulse shaping circuit for forming a square pulse in response to a sharply rising pulse having a trailing decay time.

Still another object of the invention is to provide a simple pulse shaping circuit for a scintillation counter utilizing commercially available elements.

Other objects and advantages of the invention will be apparent in the following description and claims considered together with the accompanying drawing which is a schematic wiring diagram of the invention.

Referring to the drawing in detail a scintillation type crystal 11, such as anthracene, naphthalene, or transtilbene, is disposed in a position where the presence of charged-particle radiation is suspected. A multielectrode photomultiplier tube 12 is disposed adjacent to the crystal 11, in such a manner that light emitted from the crystal falls upon the light-sensitive electrode of the tube. It is to be noted that, in the form of the invention illustrated in the drawing, the tube 12 has a light-sensitive electrode 13, a final electrode or anode 14, and nine intermediate electrodes or dynodes (numbered consecutively from 16 to 24); however, it will be apparent that photomultiplier tubes having a greater or lesser number of electrodes may be readily utilized.

Provided to supply operating potentials for the circuit is a conventional power supply 26 having a first terminal 27 at ground potential, a second terminal 28 at a potential of −105 volts, a third terminal 29 at a potential of −255 volts, a fourth terminal 30 at a potential of −1605 volts, a fifth terminal 31 at a potential of +45 volts, and a sixth terminal 32 at a potential of +300 volts. The foregoing values of potential are illustrative of the type of photomultiplier tube shown in the drawing, but may be different for other types of tubes. To suitably divide the potential between the third terminal 29 and the fourth terminal 30 a plurality of identical series-connected resistors (consecutively numbered from 36 to 45) is connected therebetween. The resistor 36, as one end of the voltage divider, is connected to the terminal 30 and to the light-sensitive electrode 13 of the tube 12 while the resistor 45, as the other end of the voltage divider, is connected to the terminal 29. Each of the first eight dynodes, 16 to 23, are connected to a respective junction between resistors, 36 to 44, so that each dynode is successively biased 150 volts positively with respect to the preceding dynode. Such connections then assure that any emission from the light-sensitive electrode 13 is attracted to the adjacent dynode 16 and from there successively to each of the other dynodes, 17 to 23, until the emission reaches the dynode 23 in greatly increased amount. The final dynode 24 is connected to one end of a resistor 47, the other end of which is connected to the junction between the resistors 44 and 45 of the voltage divider. Thus the final dynode 24 is biased more positively, by 150 volts, than the preceding dynode 23 and the emission reaching the latter dynode is attracted to the former dynode. The final electrode or anode 14 of the tube 12 is directly connected to the terminal 28 and is thereby biased more positively, by 150 volts, than the penultimate electrode 24 to attract the emission therefrom.

To utilize the characteristics of the crystal 11 and photomultiplier tube 12 combination, the junction between the final dynode 24 and the resistor 47 is connected to the control grid of a pentode amplifier tube 51 while the junction between the resistor 47 and the resistor 45 is connected to the cathode of the tube 51 through a parallel resistor 52 and capacitor 53 circuit. Thus each time electrons flow between the last two dynodes 23 and 24 of the tube 12 a voltage is developed across the resistor 47 which is impressed between the control grid and cathode of the tube 51. The screen grid of the tube 51 is biased by a connection made to the terminal 28 through a resistor 54 and any radio-frequency voltages are by-passed to the junction between the resistors 45 and 52 by a capacitor 56 connected therebetween. An internal connection is made within the tube 51 between the suppressor grid and cathode so that both electrodes are maintained at the same potential with respect to the other electrodes. A parallel connected resistor 57 and inductance 58 circuit is connected between the anode of the tube 51 and the control grid of a second pentode amplifier tube 61 to linearly pass signal voltages appearing at the anode of the tube 51. To provide frequency compensation, operating voltage to the anode of the tube 51, and bias to the control grid of the tube 61, a series-connected inductance 62 and resistor 63 circuit is connected between the control grid of the tube 61 and the screen grid of the tube 51.

The tube 61 is connected so that a large value of current is normally flowing therethrough by connecting the cathode to the terminal 29 through a resistor 66 and by-passing radio-frequency voltages at the cathode to the junction between the capacitor 56 and the resistor 54 with a capacitor 67 connected therebetween, by connecting the screen grid to ground potential by a lead 68 connected to the terminal 27 of the power supply 26 and to the screen grid of the tube 51 through a by-pass capacitor 69, by connecting the suppressor grid directly to the cathode, and by connecting the anode to the control grid of a pentode discriminator tube 71 through a parallel resistor 72 and inductance 73 circuit. To supply an operating potential to the anode of the tube 61, frequency compensation, and bias to the control grid of the tube 71 a series-connected inductance 76 and resistor 77 is connected from the control grid of the tube 71 to the junction between two resistors 78 and 79 of a voltage divider which is connected between the ground terminal 27 and positive terminal 31 of the power supply 26. As a by-pass path for radio-frequency voltages a capacitor 81 is connected in parallel with the resistor 79.

The discriminator tube 71 is further connected as follows: the cathode is connected to one end of a resistor 82, the other end of which is connected to the ground terminal 27; the screen grid is connected to the positive terminal 32 through two series-connected resistors 83 and 84 and to the cathode through a radio-frequency by-pass capacitor 86; the anode is connected to the junction between the resistors 83 and 84 through a resistor 87 and to the ground terminal 27 through a by-pass capacitor 88. The junction between the resistors 83 and 84 is also connected to the ground terminal 27 through a capacitor 89. Connected to the cathode of the tube 71 and in parallel with the resistor 82 is a limiting circuit comprising two crystal rectifiers 91 and 92 having the negative terminals thereof connected together with a resistor 93 connected from the junction to the ground terminal 27. A lead 96 is connected to the junction between the rectifiers 91 and 92 and to one side of a variable capacitor 97, the other side of which is connected to the control grid of the tube 51. The output voltage of the circuit may then be taken across the resistor 82 in the cathode circuit of the tube 71 by a lead 98 connected between the cathode of the tube 71 and an output terminal 99 and by a lead 100 connected between the ground terminal 27 and an output terminal 101.

First, consider the operation of the above-described circuit without the connections of the capacitor 97 being made so that there is no feedback voltage. Under this condition and with the power supply 26 suitably energized, a charged particle striking the crystal 11 will cause a light scintillation which is then picked up by the light-sensitive electrode 13 of the tube 12 and transformed into a corresponding pulse of electron emission. This electron emission of the light-sensitive electrode 13 is then multiplied at each of the tube dynodes in the well-known manner of operation of photomultiplier tubes. As the greatly increased electron emission is attracted from the final dynode 24 to the anode 14, current flows through the resistor 47, the interelectrode capacitance between the final dynode and anode becomes charged, and the interelectrode capacitance between the control grid and cathode of the tube 51 becomes charged. The current flowing through the resistor 47 is in such a direction as to impress a positive-going bias upon the control grid of the tube 51. The tube 51 then conducts to bias the control grid of the tube 61 negatively. It is to be noted that, because of the aforementioned interelectrode capacitance, the duration of the conductivity of the tube 51 is prolonged beyond the duration of the light pulse at the crystal 11 by the time necessary for the discharge of such interelectrode capacitance.

As stated previously the operating voltages connected to the tube 61 normally maintain the tube 61 in a conducting state whereby a large value of current is drawn through the anode circuit which maintains the tube 71 in a normally cut-off state. However, when the tube 61 becomes cut off because of the negative bias at the control grid thereof, a positive going bias is impressed on the control grid of the tube 71 which drives the tube to saturation. A positive voltage then appears at the cathode of the tube 71 across the resistor 82 in the well-known manner of a cathode-follower circuit and this positive voltage has a duration longer than the light pulse at the crystal 11 as explained above.

Now consider the circuit with the capacitor 97 connected into the circuit. It will be readily apparent that the rise time of the voltage at the cathode of the tube 71 will be the same as that described in the foregoing. Thus the voltage across the rectifiers 91 and 92 is such that a positive going voltage is coupled through the capacitor 97 to the control grid of the tube 51. The capacitor 97 is chosen to have a low value of capacitance so that the product of such capacitance and the resistance of the resistor 47 is very low. The action of such a resistance and capacitance circuit is to differentiate the input voltage whereby the voltage across the resistor 47 is proportional to the rate of change of the input voltage. Here again the rising portion of the voltage is similar to that of the output of the photomultiplier tube; however, when the tube 71 becomes saturated the voltage rise abruptly levels off to a constant value. At the time corresponding to the levelling off of the voltage, the voltage across the resistor 47 rapidly drops through zero to a slightly negative value. As soon as the voltage across the resistor 47 becomes zero the interelectrode capacitances at the input to the circuit, described previously, rapidly discharge and return the circuit to its normal state. Thus it is seen that a constant value output voltage pulse of square waveform is developed for each scintillation of the crystal 11 and that the decay time of the pulse has been considerably improved.

The foregoing circuit has been found capable of producing pulses of voltage of about .25 microsecond duration and especially useful in coincidence circuits where two or more were connected to a gate circuit. In this latter utilization it is extremely important that the pulses have a uniform maximum value and a fast decay time which the present invention readily provides.

While the salient features of the present invention have been described with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In combination, a multielectrode photomultiplier tube, means connected to the electrodes of said tube for impressing operating voltages, an amplifier having an input and an output, means responsive to current flow between two electrodes of said tube connected to the input of said amplifier, a discriminator connected to the output of said amplifier for squaring the top of the voltage output of said amplifier, and a differentiator connected between the output of said discriminator and the input of said amplifier to discharge the input capacitance of said amplifier and interelectrode capacitance of said tube.

2. In combination, a multielectrode photomultiplier tube, means connected to the electrodes of said tube for impressing operating voltages, means responsive to current flow between two electrodes of said tube, a linear amplifier connected to said responsive means, a discriminator connected to said amplifier for forming a square wave, a capacitor connected between the output of discriminator and the input of said amplifier for positive voltage feedback to return the circuit to normal conditions after each pulse.

3. In combination, a multielectrode photomultiplier tube, means connected to the electrodes of said tube for impressing operating voltages, a resistor connected between two electrodes of said tube for developing a voltage each time current flows in response to a light pulse, a linear amplifier having its input connected across said resistor to amplify voltages thereacross, a discriminator connected to the output of said amplifier for establishing a maximum voltage, a condenser connected between the output of said discriminator and the input of said amplifier for positive voltage feedback and to form a differentiator with said resistor whereby interelectrode capacitance of said tube and amplifier is discharged to rapidly return the circuit to normal condition.

4. In a pulse shaping circuit, the combination comprising a photomultiplier tube having a cathode, a plurality of dynodes, and an anode, means connected to said cathode, dynodes, and anode for impressing operating potentials, a resistor connected between the final two dynodes of said tube for developing a voltage in response to current flow between the two dynodes, means connected across said resistor for linearly amplifying said voltage, means connected to said amplifying means for flattening the top of said amplified voltage, and a capacitor connected between the output of said pulse flattener and the input of said amplifier, said capacitor having a value such that a voltage proportional to the rate of change of said flattened voltage is impressed across said resistor to discharge interelectrode and input capacitances.

5. In combination, a multielectrode photomultiplier tube, means connected to the electrodes of said tube for impressing operating voltages, an amplifier having an input and an output, means responsive to current flow between two electrodes of said tube connected to the input of said amplifier, means connected to the output of said amplifier for forming a square wave of voltage in response to the output of said amplifier, and means connected from the output of said last-named means to the input of said amplifier for feeding back a voltage pulse in phase with the input to said amplifier and proportional to the rate of change of said square wave of voltage, whereby the interelectrode capacitance of said tube and amplifier are discharged.

LOUIS F. WOUTERS.

REFERENCES CITED

The following references are of record in the file of this patent:

UNITED STATES PATENTS

| Number | Name | Date |
|---|---|---|
| 2,412,423 | Rajchman et al. | Dec. 10, 1946 |
| 2,417,805 | Barnard et al. | Mar. 25, 1947 |
| 2,550,107 | Coltman | Apr. 24, 1951 |